United States Patent Office 3,262,036
Patented July 19, 1966

3,262,036
MEANS FOR SMOOTHLY VARYING THE SPEED OF A STAR-CONNECTED POLYPHASE INDUCTION MOTOR
Christopher D. Clarke and David A. Jones, Loughborough, England, assignors to Brush Electrical Engineering Company Limited, Falcon Works, Loughborough, England
Filed Sept. 19, 1962, Ser. No. 224,768
Claims priority, application Great Britain, Sept. 21, 1961, 33,779/61
7 Claims. (Cl. 318—230)

The invention relates to controlling the speed of a star-connected polyphase induction motor of which the phases are star-connected or independent, and has reference to a variable frequency D.C. link inverter means for supplying such a motor (e.g., a squirrel-cage-type motor). With a known form of variable frequency D.C. inverter means for supplying such a motor the inverter has been fed from a single D.C. supply, but at very low motor speeds the motor rotor moves in discrete steps thus rendering the arrangement unsuitable for use in applications where a smooth motor torque is required at such low speeds (e.g., in the case where the motor is for locomotive traction). The main object of the invention is to mitigate that disadvantage by providing a variable frequency drive to a polyphase star-connected, induction motor such that the speed of the electric motor may be varied smoothly at low speeds ranging from zero, and that the electric motor develops substantially smooth torque at all motor speeds down to zero, an essential characteristic of the drive being that if the electric motor is a squirrel-cage induction motor, there are no electrical contacts in the power circuit of the drive which rub, slide or move during operation of the drive, on-off contactors and overload contactors being permitted in the power circuit as no sliding, rubbing or moving of the electrical contacts occur in these units during normal operation.

According to one aspect of the invention, two variable voltage D.C. supplies, which operate at identical variable frequencies but are out of phase, are connected through one or more inverter means to the motor windings, such that for a period in each half cycle an increasing current, derived from the one of the variable voltage D.C. supplies whose voltage is increasing, is fed through an inverter means to one phase or section of the motor windings while in the same period a decreasing current, derived from the other variable voltage D.C. supply whose voltage is decreasing, is fed through the same or different inverter means to another phase or section of the motor windings displaced from the first, the alternate increasing and decreasing variation of voltage of the D.C. supplies being so synchronised to the switching action of the inverter means that the magnetic field in the motor rotates continuously in a substantially smooth manner to exert a substantially smooth torque on the rotor at low and very low speeds.

According to a feature of this aspect of the invention, the two D.C. supplies have a common terminal connected to the star-point of the motor phases and supply a single inverter means, the D.C. supplies being arranged such that the voltage of one of them will be at its maximum value when that of the other is at a minimum, and vice versa, and the inverter means includes controlled switching elements which are controlled in phased relationship to the D.C. supplies and cause the motor phases to be connected, sequentially, to the inverter voltage input first from one of the two D.C. supplies, and then the other, alternately, whereby an A.C. voltage is developed across each selected motor phase such that as the voltage increases in one motor phase it wanes in an adjacent one to cause a smooth change in the current therein and to establish a smooth change in the angular position of the magnetic field developed in the electric motor.

It will be seen that as the angular position of the magnetic field is made to change gradually a substantially smoothly rotating field is produced which enables the motor to deliver substantially smooth torque at low, and very low speeds.

According to a further feature, in the case where a single inverter means has two separate D.C. supplies, one of the D.C. supplies develops a positive voltage, and the other a negative voltage with respect to the common terminal; while according to an alternative feature both D.C. supplies develop a positive voltage and have their negative poles connected to a common terminal.

According to another aspect of the invention each motor phase has its own D.C. supply and an individual inverter means.

Means for commutating the controlled switching elements of the inverter means can be connected in circuit between the inverter means and the D.C. supplies, or between the inverter means and the motor phases.

According to a further feature in the case where a single inverter means is associated with two D.C. supplies the outer end of each motor phase is connected to each D.C. supply through a silicon controlled rectifier acting as controlled switching element, and the silicon controlled rectifiers are actuated in pairs by respective gating circuits which are selected sequentially by a driven selector switch such that each motor phase in turn will be connected to one of the D.C. supplies while the voltage of the latter is increasing, and the motor phase cyclically in advance will be connected to the other D.C. supply while the voltage of the latter is falling.

In such a case, and according to yet another feature, use is made of a bistable circuit actuated by an oscillator for first commutating the silicon controlled rectifiers connected to one of the D.C. supplies, and then those connected to the other D.C. supply, alternately, the oscillator also actuating the rotary switch through a delay means whereby, immediately after commutation, to energise a gating circuit to fire its associated pair of silicon controlled rectifiers for connecting the phases appropriately to the D.C. supplies.

The invention will now be described further with reference to the accompanying drawings, in which.

Figure 1:
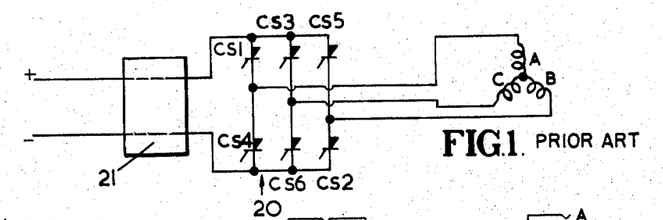
FIGURE 1 is a block diagram of the aforesaid known form of variable frequency D.C. inverter means for driving a 3-phase, squirrel-cage induction motor.

Referring firstly to FIGURE 1, the said known form of D.C. link inverter has, as shown, a single, steady D.C. supply, and the inverter, shown generally at 20, has a 3-phase output. The inverter has controlled switching elements CS1 to CS6 which are extinguished by a commutating arrangement 21, in either of the positions shown, so as to become conducting in the sequence 1+6, 1+2, 3+2, 3+4, 5+4, 5+6, repeated, the frequency of operation of the commutating arrangements and the inverter being controllable by means (not shown) for varying the speed of the motor. The outputs of the inverter to motor phases A, B and C will follow the potentials shown in FIGURE 2, and the torque from the electric motor will be as shown in FIGURE 3 for low inverter frequencies, and thus, for the consequent low motor speeds.

Figures 2, 3:
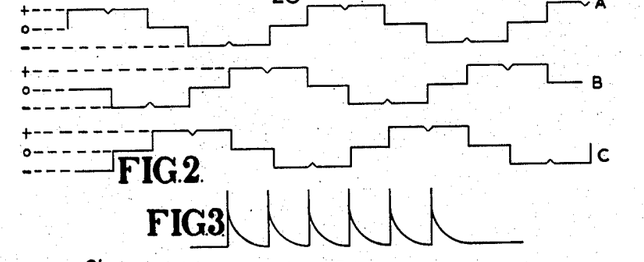
FIGURE 2 is a diagram of the output potentials of the inverter means of FIGURE 1.
FIGURE 3 is a diagram illustrating the torque developed by the motor when driven in the manner of FIGURE 1 at low and very low speeds.

Reference to FIGURE 3 shows that at slow, or very slow speeds the output torque alternates between a maximum and zero, thus causing the motor rotor to rotate in a series of jerky steps; but it will be realised that as the motor speed increases the time interval between the jerks becomes progressively reduced until such time as the motor will, to all intents and purposes, run smoothly.

This jerky operation at low speeds is a great disadvantage in many motor applications, particularly in the cases where the motor is for propelling a locomotive. The invention overcomes this disadvantage of discontinuous torque at low speed, as will be appreciated by referring to FIGURE 4. The latter shows a positive D.C. supply DC1 and a negative D.C. supply DC2 having a common terminal T. These supplies are such as to develop rising and falling voltage waveforms at a common, controlled variable frequency as hereinafter more fully described. The voltage waveform of the positive supply DC1 is shown in FIGURE 5a and that of the negative supply DC2 in FIGURE 5b, and these waveforms constitute the input to the inverter 20. The latter, as in the known case, includes controlled switching elements CS1 to CS6 with a commutating arrangement 21 in one of the positions shown in FIGURE 4 or FIGURE 4A and constituting a 3-phase output bridge for feeding a 3-phase, star-connected, squirrel-cage induction motor of which the phases are indicated at A, B and C. The star-point of these phases is connected to the common terminal T of the two D.C. supplies.

Figures 5A, 5B:
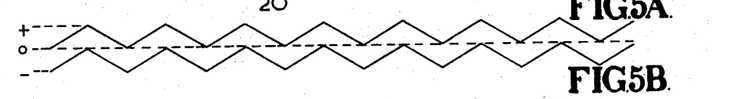
FIGURE 5 is a composite diagram concerning the embodiment of FIGURE 4 and showing at FIGURES 5a and 5b the waveforms associated with the two D.C. supplies; at FIGURE 5c the sequencing of the switching elements of the inverter; and at FIGURES 5d, 5e and 5f the voltages developed across the three phases of the motor.
Figure 5C:
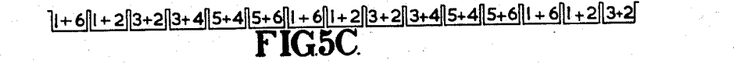

The controlled switching elements of the inverter CS1 to CS6 are made conducting in the sequence 1+6, 1+2, 3+2, 3+4, 5+4, 5+6, repeated, being correlated in respect of frequency and time to the variation of the D.C. supplies such that CS1 and CS6 are made conducting when the positive D.C. inverter supply DC1 is zero and the negative D.C. inverter supply DC2 is a maximum as shown in FIGURE 5c. Thereafter the controlled switching elements of the inverter are made conducting in the sequence detailed above, the action of switching to the next inverter pair of controlled switching elements coinciding with the next maximum occurring in the output of either the positive or negative D.C. supply to the inverter. In this way, the potentials at the outputs of the inverter and the voltage developed across the phases of the electric motor are as shown in FIGURES 5d, e and f.

Figure 5D:
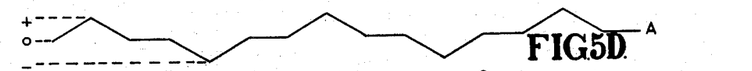
Figure 5E:
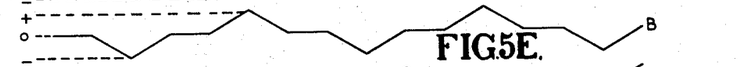
Figure 5F:
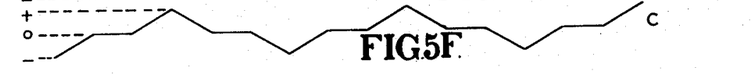

A comparison between the output voltages of the known arrangement as shown in FIGURE 2, with the output voltages shown in FIGURES 5d, e and f discloses that the latter output voltages change far more smoothly. Thus, the application to the motor phases of the waveforms shown in FIGURES 5d, e and f will cause the magnetic field of the motor to rotate substantially smoothly and provide a substantially smooth output torque from the motor. The above description is for illustration only, and the application of the invention is described later.

By using this system, and arranging a suitable number of controlled switching inverter elements each arranged to be made conducting at a suitable time, any number of A.C. outputs may be provided by the inverter in correct phase relationship to provide a smoothly rotating magnetic field in an electric motor with a corresponding number of phases and will result in the development of a smooth torque by the motor.

Further, it is not essential that the rise and fall of voltage of the positive and negative D.C. supplies should be linear or absolutely smooth. The rise in voltage may follow any law which is suitable for use with the system to provide at least a substantially smooth torque from the electric motor, and the actual rise and fall of the voltage of the D.C. supplies may be in the form of a staircase or any other form suitable for providing at least a substantially smooth torque from the electric motor. In addition to the foregiing, it must be understood that some methods of commutation may produce short duration transient voltages on the waveforms developed at the output terminals of the inverter, and that any such transients shall be acceptable, provided that the torque output from the electric motor is substantially smooth.

Figure 4:
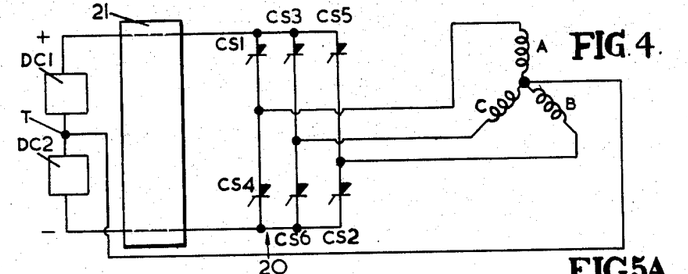
FIGURE 4 is a block diagram illustrating one embodiment of the present invention.
Figure 4A:
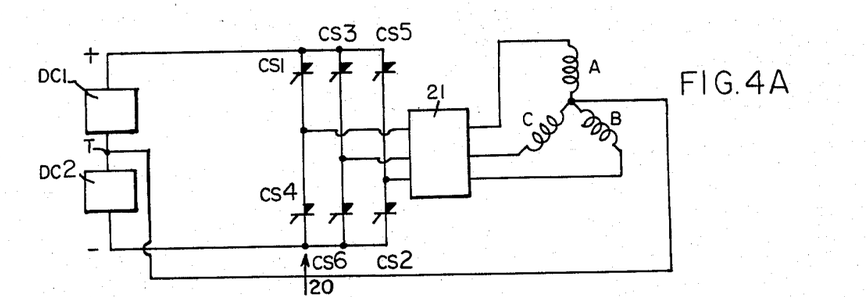
FIGURE 4A is the same as FIGURE 4 but shows a commutating arrangement in a different position.
Figure 6:
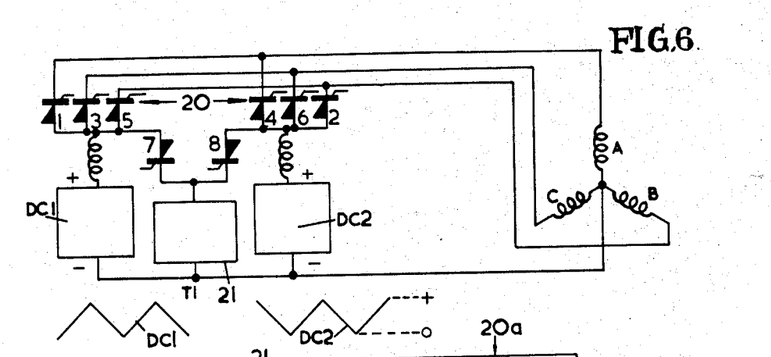
FIGURE 6 is a block diagram illustrating another embodiment of the invention.

The modification shown in FIGURE 6 differs from that in FIGURE 4 in that the two D.C. supplies are positive and have their common terminal T1 connected both to the star-point of the motor and to a commutating circuit 21. The waveforms of the two D.C. sources are indicated respectively beneath them in the figure. The switching elements 1 to 6 are silicon controlled rectifiers, and the odd numbered elements are commutated by a silicon controlled rectifier 7, and the even numbered ones by a silicon controlled rectifier 8, and the said elements 1 to 6 are made conducting in the same sequence as in FIGURE 4, and the arrangement operates in a manner similar to that described with reference to the latter figure.

Figure 7:
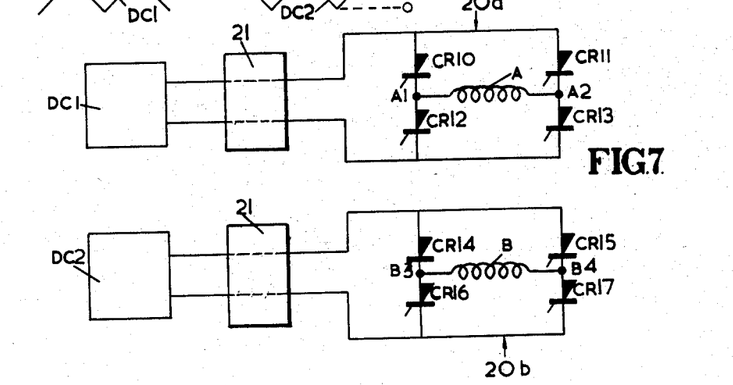
FIGURE 7 is a block diagram illustrating yet another embodiment of the invention in which a 2-phase motor has each phase supplied from a separate D.C. supply and inverter combination.

FIGURE 7 shows an application of the invention in which each phase of a motor is supplied from a separate D.C. source and inverter combination. The figure shows the arrangement for a 2-phase motor, but this embodiment of the invention is of equal application when the motor has more than two phases, the provisions made for each phase being precisely the same.

In the figure the two motor phases are shown at A and B, and their respective, variable D.C. supplies at DC1 and DC2. The inverter 20a for phase A includes controlled switching elements CR10 to CR13, and the inverter 20b for phase B includes controlled switching elements CR14 to CR17. Between each D.C. supply and its associated inverter is a commutating arrangement 21 for the controlled switching elements.

Figure 8A:
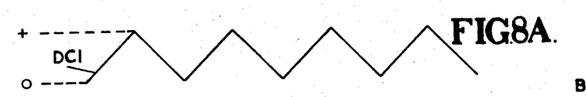
FIGURE 8 is a composite diagram showing at FIGURES 8a and 8b the waveforms associated with the two D.C. supplies of FIGURE 7; at FIGURE 8c the arrangement of the two windings of the motor; at FIGURE 8d the firing sequence for the controlled switching elements of the two inverters of FIGURE 7, and at FIGURE 8e the manner in which the direction of the magnetic field of the motor varies due to the fluctuation of the D.C. supplies and the switching action of the inverters.
Figure 8B:
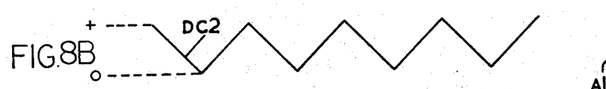
Figure 8C:
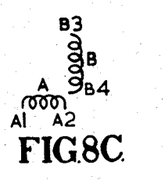
Figure 8D:
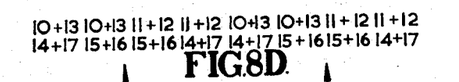

It will be seen from FIGURE 8c that the ends marked

A2 and B4 of phases A and B respectively may be connected together.

Figure 8E:
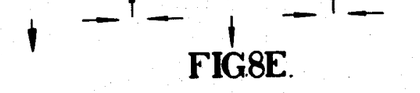

Referring now to FIGURES 8a, 8b, 8d and 8e, it will be seen from FIGURES 8a and 8b that while the voltage of D.C. supply DC1 rises from zero to maximum positive, the voltage of D.C. supply DC2 falls from maximum positive to zero, and vice versa. By firing the controlled switching elements in the order shown in FIGURE 8d the direction of the magnetic field of the motor is changed as indicated in FIGURE 8e. Thus, and taking the first firing combinations at the left of FIGURE 8d, an increasing voltage will be applied at end A1 of phase A relative to end A2 at the same time as the voltage applied at end B3 of phase B is decreasing relative to end B4, during the next firing combination the voltage applied at end A1 of phase A will decrease relative to end A2 while the voltage applied to end B4 of phase B increases relative to end B3, and during the third firing combination the voltage applied to end B4 of phase B decreases relative to end B3 while the voltage applied to end A2 of phase A increases relative to end A1.

The benefits of performance due to the action above described, as opposed to the performance of the said known D.C. link inverter, reduce as the speed of the drive is increased. There is a point, when increasing the drive speed from zero, where the torque from the known D.C. link inverter is sufficiently smooth, due to the flywheel effect of the motor and load, and to the inductive effects of the motor windings, to be as suitable as the torque at the same speed from the D.C. link inverter of the invention. At drive speeds above this point more power can be developed from the electric motor if it is fed from the known D.C. link inverter than if it is fed from the D.C. link inverter of the invention. It may therefore be desirable in some instances to switch from the new system to the old at this point.

Figure 9:
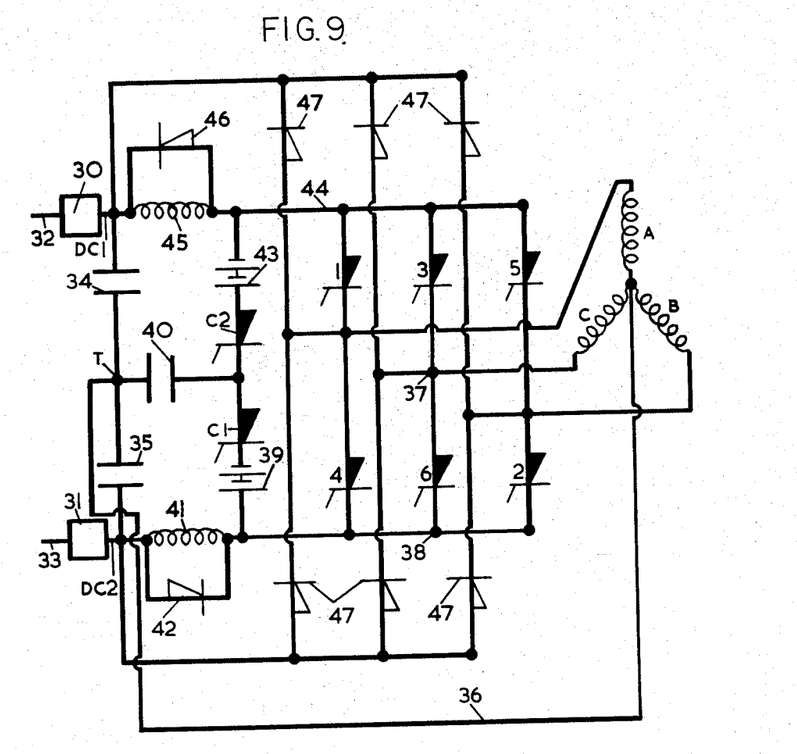
FIGURE 9 is a circuit diagram corresponding with FIGURE 4 illustrating the power circuit.

FIGURE 9 shows the power circuit involved in FIGURE 4 in greater detail. The controlled switching elements CS1 to CS6 are, however, in this case shown as silicon controlled rectifiers 1 to 6. The positive and negative D.C. supplies DC1 and DC2 are respectively derived from the outputs of devices 30 and 31 which are respectively fed from steady D.C. sources indicated at 32 and 33. The devices 30 and 31, which can be of any known kind, are for providing the fluctuating voltages required for DC1 and DC2, and the fluctuation is controlled as presently described with reference to FIGURE 10. The DC1 and DC2 supplies are connected to the common terminal T through capacitors 34 and 35 to provide a reference point of zero potential connected to the starpoint of the motor phases through line 36.

The silicon controlled rectifiers are fired in the appropriate order by gating circuits, as will presently be described with reference to FIGURE 11, and before each new pair of them are fired a commutating pulse is fed either to the even, or odd numbered ones whereby to extinguish the silicon controlled rectifier, of the previously fired pair, which is not required.

For convenience of the subsequent description rectifiers 1, 3 and 5 will be referred to collectively as the odd rectifiers, and 2, 4 and 6 as the even rectifiers.

Having regard to the order in which the rectifiers are fired (i.e., 1+6, 1+2, 3+2, 3+4, 5+4, 5+6) it will be assumed that the pair 1+6 has already been fired and that it is now desired to fire 1+2. Before this can be done it is necessary to extinguish 6. The latter is among the even rectifiers, of which 2 and 4 were previously extinguished. For extinguishing rectifier 6 it is necessary to make phase-connection point 37 negative with respect to point 38, and this is done by firing a silicon controlled rectifier C1 which is in series with a D.C. source 39 whereby to convey the charge of capacitor 40 which is at a voltage equal to the positive voltage DC2 plus the positive voltage of source 39. The capacitor 40 applies this positive voltage plus the positive voltage of source 39 to point 38 whereby point 38 is made more positive than point 37 by an amount equal to twice the voltage of source 39. This commutates rectifier 6.

Capacitor 40 recharges negative while current flows through choke 41, source 39 and silicon controlled rectifier C1, until the capacitor 40 reaches a potential equal to the negative voltage of DC2 plus the negative voltage of source 39. At this point the silicon controlled rectifier C1 extinguishes itself and the current that is flowing through choke 41 is now carried by diode 42.

In a somewhat similar manner, when one of the odd rectifiers is to be commutated, silicon controlled rectifier C2 in series with a D.C. source 43 acts to convey the negative charge on capacitor 40 to line 44, common to the odd rectifiers, so as to make it more negative than their respective motor phases.

Capacitor 40 recharges positive while current flows through choke 45, source 43 and silicon controlled rectifier C2 until the capacitor 40 reaches a potential equal to the positive voltage of DC1 plus the positive voltage of source 43. At this point the silicon controlled rectifier C2 extinguishes itself and the current flowing through choke 45 is now carried by diode 46.

When any of silicon controlled rectifiers 1 to 6 are commutated it is important to dispose of reactive current of the motor phase concerned, and this is done through respective diodes 47.

Figure 10:
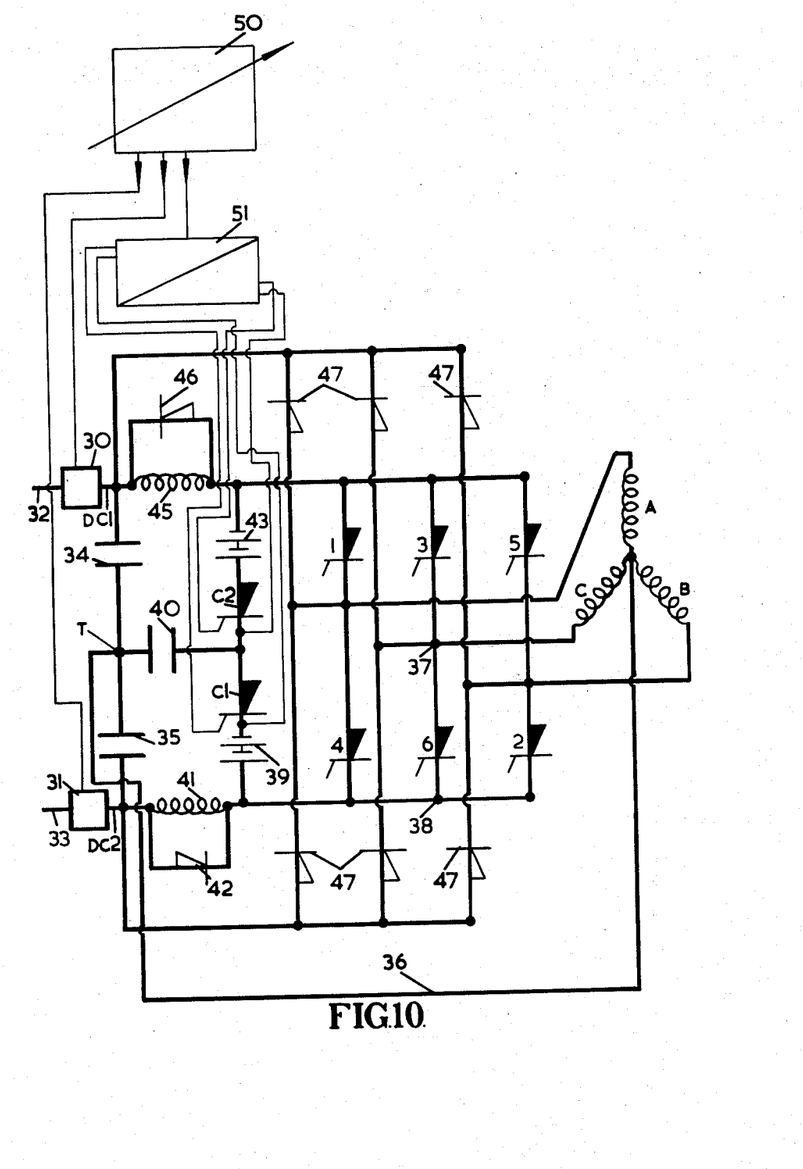
FIGURE 10 shows how the commutation and the frequency of the D.C. supplies shown in FIGURE 9 are controlled.

FIGURE 10 repeats the showing of FIGURE 9 and shows, in addition, how the commutation of the silicon controlled rectifiers 1 to 6, and the frequency of the variable-voltage D.C. supplies DC1 and DC2 are controlled. In this figure is shown an oscillator 50, of which the frequency can be controlled, which is connected to the devices 30 and 31 so as to operate them at its own frequency, and, at the said frequency, to a bistable circuit 51 for firing the commutating silicon controlled rectifiers C1 and C2 in turn.

Figure 11:
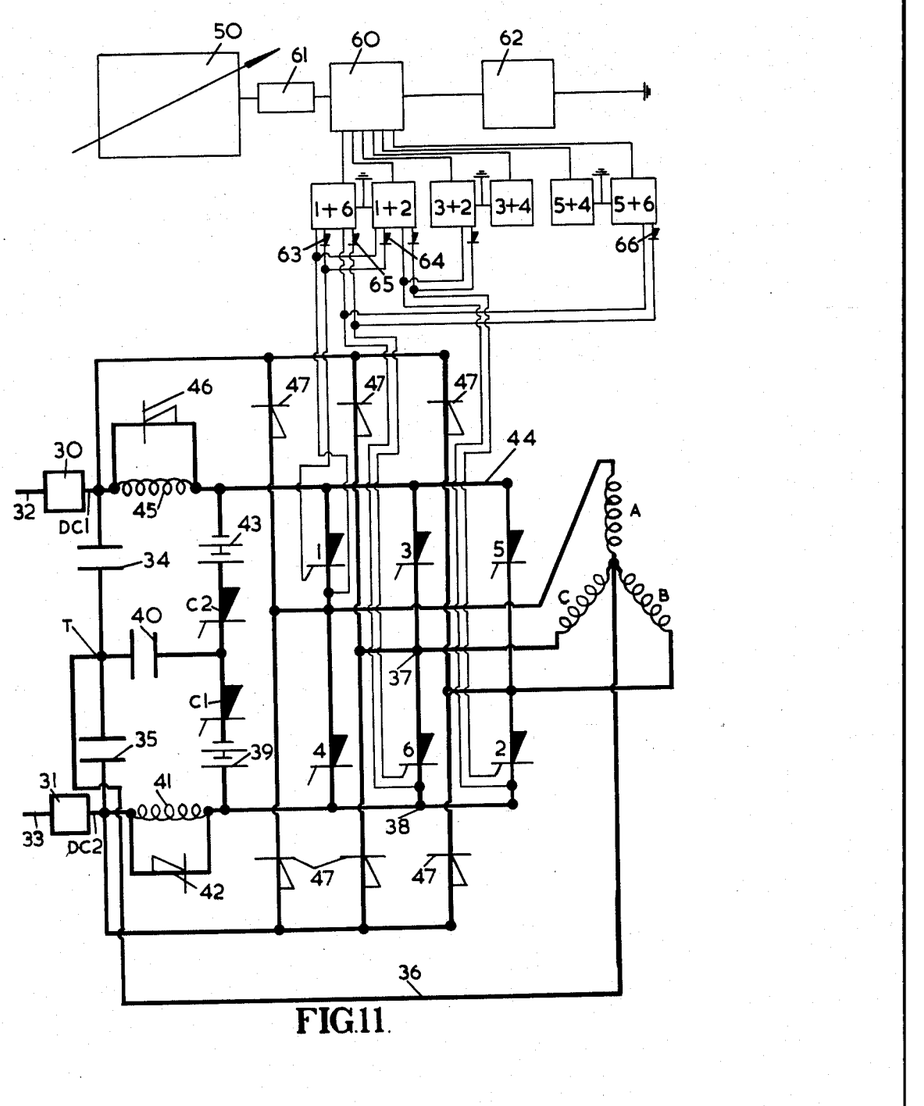
FIGURE 11 shows how the inverter of FIGURE 9 is controlled.

FIGURE 11 also repeats the showing of FIGURE 9, but additionally shows the oscillator 50 of FIGURE 10 performing another function of synchronising the action of the inverter.

The said oscillator drives a rotary switch 60, through a delay device 61 of any suitable known kind, in synchronism with its own frequency. The rotary switch feeds a signal pulse, having a square waveform, from a device 62, more fully described with reference to FIGURE 13, selectively to gating circuits for each associated pair of odd and even silicon controlled rectifiers 1 to 6. The gating circuits for the rectifiers are shown in block form and are identified in the figure by the reference numerals of the rectifiers they respectively fire (i.e., 1+6, 1+2, 3+2, 3+4, 5+4, 5+6).

Figure 12:
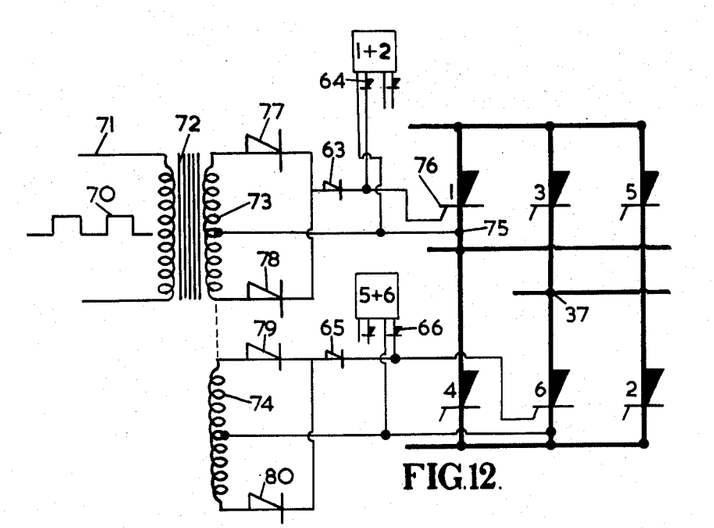
FIGURE 12 is a circuit diagram of one of the paired gating circuits of FIGURE 11.

The outputs from these gating circuits, which latter are more fully described with reference to FIGURE 12, are applied across their associated pairs of rectifiers, in the order dictated by rotary switch 60, to fire them for feeding the associated motor phases with the outputs from DC1 and DC2, as appropriate.

It will be observed that each adjacent pair of gating circuits controls one of the silicon controlled rectifiers in common. Thus, rectifier 1 is common to gating circuits 1+6 and 1+2, and rectifier 2 is common to gating circuits 1+2 and 3+2, and so on. For this purpose gating circuit 1+2 is shown as having a connection to the output circuit from gating circuit 1+6 for supplying rectifier 1, but in order to avoid a feed back into gating circuit 1+6 when gating circuit 1+2 is operating, the path to rectifier 1 from gating circuit 1+6 is through a diode 63. Another diode 64 performs the same function when gating circuit 1+6 is operating and gating circuit 1+2 is not. The corresponding diodes for gating circuits 1+6 and 5+6 are shown at 65 and 66. It will be seen that a similar provision is made as between gating circuit 1+2 and 3+2, and between gating circuits 1+6 and 5+6, but for the purpose of simplified reading the equivalent provisions for the other gating circuits are not shown.

Each of these gating circuits includes a transformer of which the primary winding is fed with the square wave form output from device 62, and which has two secondary windings whose outputs are applied to the respective rectifiers for firing them. Such a gating circuit for firing the pair of rectifiers 1 and 6 is shown in FIGURE 12.

In FIGURE 12 the square waveform output from device 62 is indicated at 70 and is applied to the primary winding 71 of a transformer of which the magnetic core is shown at 72. The core has secondary windings 73 and 74 about it, and these are respectively connected for firing rectifiers 1 and 6.

The secondary winding 73 has a central connection to point 75 and its ends are connected to the grid 76 of rectifier 1 through diodes 77 and 78 which make the grid positive with reference to point 75 whereby to fire the rectifier. The secondary winding 74 and its diodes 79 and 80 fire rectifier 6 in precisely the same manner.

Figure 13:
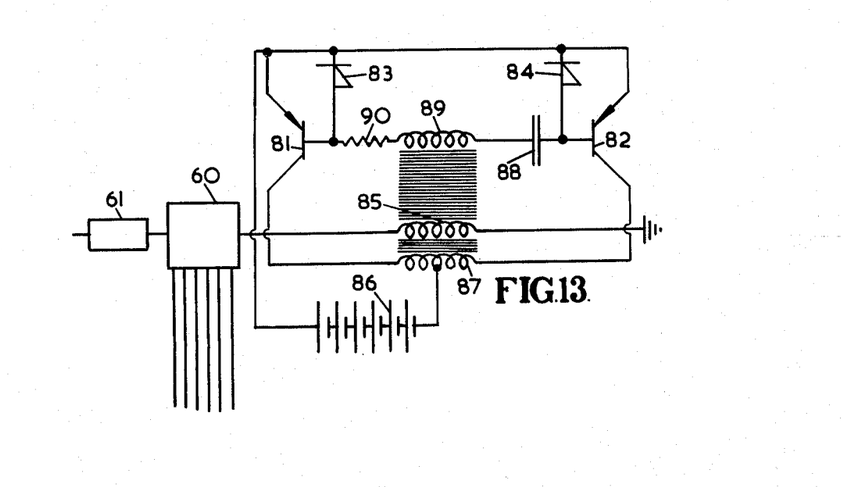
FIGURE 13 is a circuit diagram of an electronic pulse generator shown in FIGURE 11.

The device 62 is shown in FIGURE 13 as a typical, known circuit employing transistors 81 and 82, and diodes 83 and 84 whereby to induce a square waveform pulse in a secondary winding 85 to be fed to the rotary switch 60, the associated components shown being a steady D.C. source 86 connected to a central tapping of a primary winding 87, a capacitor 88, a feed-back winding 89 and a resistor 90. The square waveform pulse is fed to the movable contact of the rotary switch 60 for selective feeding to the gating circuits.

Figure 14:
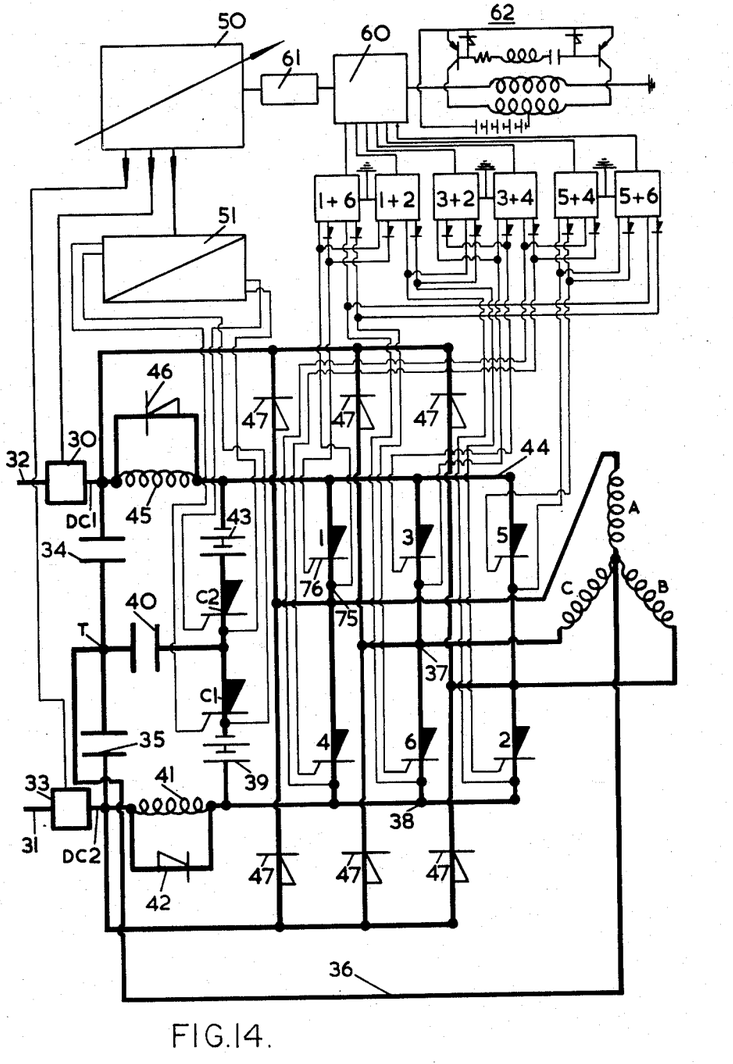
FIGURE 14 is a circuit diagram combining the circuits of FIGURES 10, 11 and 13.

For ease of comprehension the various circuits have been described separately with reference to FIGURES 9 to 13, but are shown co-ordinated in FIGURE 14, in which latter the power circuit has been drawn in heavy lines, and the various control circuits have been drawn in lighter lines. Thus, FIGURE 14 shows the oscillator 50 controlling the frequency of the voltage fluctuations of the supplies DC1 and DC2, the firing of the rectifiers and their commutation. Delay 61 ensures that commutation takes place before the rotary switch 60 selects a new pair of rectifiers to be fired. It will therefore be seen that by increasing the frequency of the oscillator from zero the motor can be accelerated smoothly from rest.

What we claim as our invention and desire to secure by Letters Patent of the United States is:

1. A variable frequency D.C. link inverter means for supplying a star-connected polyphase induction motor such that its speed can be varied smoothly from zero to very high speeds and such that it develops substantially smooth torque at all speeds within its range, comprising an inverter having a number of output phases equal to the number of phases of the motor, said inverter including controlled switching elements for sequentially connecting its said output phases to said motor phases respectively, a commutating circuit for artificially commutating said switching elements, a firing circuit for firing said switching elements for sequentially connecting said output phases of said inverter to said motor phases respectively, a D.C. voltage supply for said inverter, a connection from said D.C. voltage supply to the star point of said motor, a circuit for repeatedly varying the voltage of said D.C. supply in synchronism with the operation of the switching elements of the inverter, and a circuit for varying the frequency at which the voltage variations occur.

2. A variable frequency D.C. link inverter means for supplying a star-connected polyphase induction motor such that its speed can be varied smoothly from zero to very high speeds and such that it develops substantially smooth torque at all speeds within its range, comprising an inverter having a number of output phases equal to the number of phases of the motor, said inverter including controlled switching elements for sequentially connecting its output phases to said motor phases respectively, a commutating circuit for artificially commutating said switching elements, a firing circuit for firing said switching elements for sequentially connecting said output phases of said inverter to said motor phases respectively, two D.C. voltage supplies for said inverter, a common terminal to which said D.C. voltage supplies are connected together, one of said D.C. voltage supplies having a positive voltage with respect to said common terminal and the other of said D.C. voltage supplies having a negative voltage with respect to said common terminal, a connection between said common terminal and the star point of said motor, a circuit for smoothly and repeatedly varying the voltages of said supplies from zero to maximum inversely and in synchronism, a circuit for varying the frequency at which the voltage variations occur, and means for operating said commutating means and said firing means in timed relation to the voltage variations of said sources, and at the same frequency.

3. A variable frequency D.C. link inverter means for supplying a star-connected polyphase induction motor such that its speed can be varied smoothly from zero to very high speeds and such that it develops substantially smooth torque at all speeds within its range, comprising an inverter having a number of output phases equal to the number of phases of the motor, said inverter including switching elements for sequentially connecting its said output phases to said motor phases respectively, two D.C. voltage supplies for said inverter, a common terminal to which said D.C. voltage supplies are connected together, one of said D.C. voltage supplies having a positive voltage with respect to said common terminal and the other of said D.C. voltage supplies having a negative voltage with respect to said common terminal, a connection between said common terminal and the star point of said motor, a circuit for smoothly and repeatedly varying the voltages of said supplies from zero to maximum inversely and in synchronism, a circuit for varying the frequency at which the voltage variations occur, said switching elements adapted sequentially to connect one motor phase during a period in each half cycle to be supplied from said inverter with an increasing current derived from the one of said variable voltage D.C. supplies whose voltage is increasing, and in the same period to connect another motor phase to be supplied from said inverter with a decreasing current derived from the other of said variable voltage D.C. supplies whose voltage is decreasing, and means for synchronizing the variation in voltage of said D.C. supplies with the switching action of said inverter.

4. A variable frequency D.C. link inverter means for supplying a star-connected polyphase induction motor such that its speed can be varied smoothly from zero to very high speeds and such that it develops substantially smooth torque at all speeds within its range, comprising an inverter having a number of output phases equal to the number of phases of the motor, two D.C. voltage supplies for said inverter, a common terminal to which said D.C. voltage supplies are connected together, one of said D.C. voltage supplies having a positive voltage with respect to said common terminal and the other of said D.C. voltage supplies having a negative voltage with respect to said common terminal, a connection between said common terminal and the star point of said motor, a circuit for smoothly and repeatedly varying the voltages of said D.C. supplies from zero to maximum inversely and in synchronism, a circuit for varying the frequency at which the voltage variations occur, and said inverter including switching elements for sequentially connecting said motor phases cyclically in pairs between the inverter voltage inputs from said two D.C. supplies.

5. A variable frequency D.C. link inverter means according to claim 2 in which the circuit for commutating the controlled switching elements is connected between the inverter and the D.C. supplies.

6. A variable frequency D.C. link inverter means according to claim 2 in which the circuit for commutating the controlled switching elements is connected between the motor phases and the inverter phases.

7. Means for maintaining a substantially smooth rotating magnetic field in a polyphase induction motor fed at low frequencies from a variable frequency semi-conductor polyphase D.C. link inverter which has one end of each phase winding connected to a common point in order to produce a torque from the motor which is substantially smooth at all speeds and loads within its range, the means comprising an inverter having a number of output phases equal to the number of phases of the motor, said inverter including controlled switching elements for sequentially connecting the motor phases to the positive and negative D.C. input terminals of the inverter, a commutating circuit for artificially commutating said controlled switching elements, a firing circuit for firing said controlled switching elements in a repeated sequence, a D.C. supply to the inverter, said D.C. supply comprising two independently variable D.C. supplies connected in series and varying such that the D.C. supply to the inverter remains substantially constant for any given frequency but varies approximately proportionately with frequency, the voltage of the two variable D.C. supplies adapted to be repeatedly and substantially smoothly varied in synchronism with the operation of the firing circuit for firing the control switching elements, the voltage of the D.C. supplies being varied from a low value preferably approximately zero voltages to a high value preferably approximately equal to the required D.C. voltage input required for the inverter and back to the low value, the voltage of one D.C. supply being at maximum when the voltage of the other D.C. supply is at minimum, a connection from the midpoint of the series-connected variable D.C. supplies to the common point connecting one end of each of the motor phase windings, the current in each motor phase winding being thereby increased or reduced smoothly by virtue of having a voltage applied to it which is varying repeatedly between approximately zero and approximately the maximum value of the D.C. input voltage to the inverter applied across it in synchronism with the operation of the firing circuit, the variation of voltage of the two D.C. supplies being increasingly important as the frequency is reduced and having maximum effect at the starting and very slow crawling inverter frequencies and motor speeds, the variation of voltage of the two variable D.C. supplies being reduced to zero if required as the speed is increased, the voltage supplied to each phase winding then being varied only due to the switching sequence of the control switching elements.

References Cited by the Examiner
UNITED STATES PATENTS

| | | | |
|---|---|---|---|
| 2,713,657 | 7/1955 | Toulon | 318—231 X |
| 2,784,365 | 3/1957 | Fenemore | 318—230 |
| 3,124,732 | 3/1964 | Dupy | 318—138 |

ORIS L. RADER, *Primary Examiner.*

C. E. ROHRER, J. C. BERENZWEIG,
*Assistant Examiners.*